United States Patent
Lemmers, Jr.

(10) Patent No.: US 12,549,075 B2
(45) Date of Patent: Feb. 10, 2026

(54) RECTIFIER ASSEMBLIES

(71) Applicant: Hamilton Sundstrand Corporation, Charlotte, NC (US)

(72) Inventor: Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 189 days.

(21) Appl. No.: 18/231,788

(22) Filed: Aug. 9, 2023

(65) Prior Publication Data

US 2025/0055352 A1 Feb. 13, 2025

(51) Int. Cl.
| | |
|---|---|
| *H02K 11/04* | (2016.01) |
| *H02K 11/042* | (2016.01) |
| *H02K 19/28* | (2006.01) |
| *H02K 19/38* | (2006.01) |

(52) U.S. Cl.
CPC ........... *H02K 11/042* (2013.01); *H02K 19/28* (2013.01); *H02K 19/38* (2013.01)

(58) Field of Classification Search
CPC ...... H02K 11/00; H02K 11/04; H02K 11/042; H02K 19/00; H02K 19/28; H02K 19/38; H02M 7/00; H02M 7/003; H02M 7/06; H01L 23/00; H01L 23/40; H01L 23/4006; H01L 25/00; H01L 25/07; H01L 25/072; H01L 25/10; H01L 25/11; H01L 25/115
See application file for complete search history.

(56) References Cited

U.S. PATENT DOCUMENTS

| | | | |
|---|---|---|---|
| 5,998,893 A | * | 12/1999 | Fowler ............... H02K 9/06 310/68 R |
| 7,511,392 B2 | | 3/2009 | Rubbo et al. |
| 9,154,046 B2 | | 10/2015 | Krause et al. |
| 11,139,723 B2 | | 10/2021 | Patel et al. |
| 2003/0047304 A1 | | 3/2003 | Kasuga |
| 2006/0176720 A1 | | 8/2006 | Lemmers et al. |
| 2010/0054005 A1 | | 3/2010 | Grosskopf et al. |

FOREIGN PATENT DOCUMENTS

| | | |
|---|---|---|
| EP | 2866333 A2 | 4/2015 |
| FR | 2944655 A1 | 10/2010 |

OTHER PUBLICATIONS

European Search Report dated Feb. 12, 2025 in connection with European Patent Application No. 24193962.8, 12 pages.

* cited by examiner

*Primary Examiner* — Tran N Nguyen

(57) ABSTRACT

An electrical machine assembly includes an armature assembly defining a rotational axis and a rectifier assembly including at least one diode and defining a central rectifier axis. The armature assembly is configured and adapted to be coupled with a rotor shaft for relative rotation therewith. The central rectifier axis is at a non-parallel angle relative to the rotational axis. A rectifier assembly includes a first diode and a second diode stacked with the first diode. The rectifier assembly includes an AC terminal positioned between the first diode and the second diode and a DC positive output pin electrically coupled to the first diode. A portion of the AC terminal extends outward from the rectifier assembly at a non-parallel angle relative to the central longitudinal axis of the rectifier assembly. A central longitudinal axis of the rectifier assembly can be parallel to the DC positive output pin.

20 Claims, 4 Drawing Sheets

RECTIFIER ASSEMBLIES

TECHNICAL FIELD

The present disclosure relates to electrical machines, and more particularly to electrical generator systems with rotating components.

BACKGROUND

Electrical machines, such electrical generator systems, generally include a main generator assembly with a main stator and a main rotor, and also include an armature assembly coupled to the main rotor. The armature assembly can include rectifier assemblies configured and adapted to convert alternating current generated by the generator system to direct current. The exciter then supplies that direct current to a field winding of the main machine. Rotational movement of the main rotor may impart forces on other components within the generator system, e.g., the rectifier assemblies in the exciter assembly, or the like.

The conventional techniques have been considered satisfactory for their intended purpose. However, there is an ever present need for improved systems and methods for generator system architectures. This disclosure provides a solution for this need.

SUMMARY

An electrical machine assembly includes an armature assembly defining a rotational axis and a rectifier assembly including at least one diode and defining a central rectifier axis. The armature assembly is configured and adapted to be coupled with a rotor shaft for relative rotation therewith. The central rectifier axis is at a non-parallel angle relative to the rotational axis.

One or more embodiments include the system/apparatus of any previous paragraph, and wherein the central rectifier axis can be at a perpendicular angle relative to the rotational axis.

One or more embodiments include the system/apparatus of any previous paragraph, and wherein the at least one diode of the rectifier assembly can include two diodes separated from one another by an AC terminal.

One or more embodiments include the system/apparatus of any previous paragraph, and wherein the rectifier assembly can include a DC negative/ground output cap positioned on a side of one of the two diodes opposite from the AC terminal.

One or more embodiments include the system/apparatus of any previous paragraph, and wherein the electrical machine assembly can include an exciter hub casing electrically coupled to a ground plate and a DC negative terminal.

One or more embodiments include the system/apparatus of any previous paragraph, and wherein the exciter hub casing can be electrically coupled to the DC negative/ground output cap of the rectifier assembly.

One or more embodiments include the system/apparatus of any previous paragraph, and wherein at least one diode can define a perimeter and a flat surface, wherein the central rectifier axis can be defined perpendicular to the flat surface of the at least one diode.

One or more embodiments include the system/apparatus of any previous paragraph, and wherein the rectifier assembly can be a first rectifier assembly.

One or more embodiments include the system/apparatus of any previous paragraph, and wherein the electrical machine assembly can include two additional rectifier assemblies the same as the first rectifier assembly.

One or more embodiments include the system/apparatus of any previous paragraph, and wherein the two additional rectifier assemblies can each offset from the first rectifier assembly by at least ninety degrees about the rotational axis.

One or more embodiments include the system/apparatus of any previous paragraph, wherein the electrical machine assembly can include a dummy rectifier assembly offset from the first rectifier assembly by at least ninety degrees about the rotational axis.

One or more embodiments include the system/apparatus of any previous paragraph, and wherein the dummy rectifier assembly can have the same mass and center of gravity as the first rectifier assembly and the two additional rectifier assemblies to allow for mechanical balancing of the electrical machine assembly.

One or more embodiments include the system/apparatus of any previous paragraph, and wherein the electrical machine assembly can include a DC positive connector ring and a DC positive terminal in electrical communication therewith.

One or more embodiments include the system/apparatus of any previous paragraph, and wherein the DC positive connector ring can be positioned between at least one rectifier assembly and the DC positive terminal.

One or more embodiments include the system/apparatus of any previous paragraph, and wherein at least one rectifier assembly can include a DC positive output pin in electrical communication with the at least one diode.

One or more embodiments include the system/apparatus of any previous paragraph, and wherein the DC connector ring can include a radially facing connection aperture.

One or more embodiments include the system/apparatus of any previous paragraph, and wherein the DC positive output pin can be electrically coupled within the radially facing connection aperture.

One or more embodiments include the system/apparatus of any previous paragraph, and wherein the electrical machine assembly can be an exciter assembly.

One or more embodiments include the system/apparatus of any previous paragraph, and wherein the rotational axis A is defined through a center point of the armature assembly.

In accordance with another aspect, a rectifier assembly includes a first diode and a second diode stacked with the first diode. A central longitudinal axis of the rectifier assembly can be defined through a center of the first and second diodes. The rectifier assembly includes an AC terminal positioned between the first diode and the second diode and a DC positive output pin electrically coupled to the first diode. A portion of the AC terminal extends outward from the rectifier assembly at a non-parallel angle relative to the central longitudinal axis of the rectifier assembly. The central longitudinal axis of the rectifier assembly can be parallel to the DC positive output pin.

One or more embodiments include the system/apparatus of any previous paragraph, and wherein a DC negative/ground output cap can be positioned on a side of the second diode opposite from the AC terminal.

One or more embodiments include the system/apparatus of any previous paragraph, and wherein the DC negative/ground output cap can be in electrical communication with the second diode.

One or more embodiments include the system/apparatus of any previous paragraph, and wherein a conductive spacer can be positioned between the second diode and the DC negative/ground output cap.

One or more embodiments include the system/apparatus of any previous paragraph, and wherein an insulator ring can be stacked between the first and second diodes.

One or more embodiments include the system/apparatus of any previous paragraph, wherein the central longitudinal axis of the rectifier assembly can be configured and adapted to be at a perpendicular angle relative to a rotational axis of an electrical machine.

One or more embodiments include the system/apparatus of any previous paragraph, and wherein the non-parallel angle can be a perpendicular angle.

One or more embodiments include the system/apparatus of any previous paragraph, and wherein an insulative housing portion can be on a side of the first diode opposite from the second diode.

One or more embodiments include the system/apparatus of any previous paragraph, and wherein the insulative housing portion can include an aperture configured and adapted to receive a portion of the AC terminal.

One or more embodiments include the system/apparatus of any previous paragraph, and wherein the first and second diodes can each define a respective perimeter and a respective flat surface.

One or more embodiments include the system/apparatus of any previous paragraph, and wherein the central longitudinal axis can be defined through the first and second diodes at a non-parallel angle relative to the respective flat surfaces.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
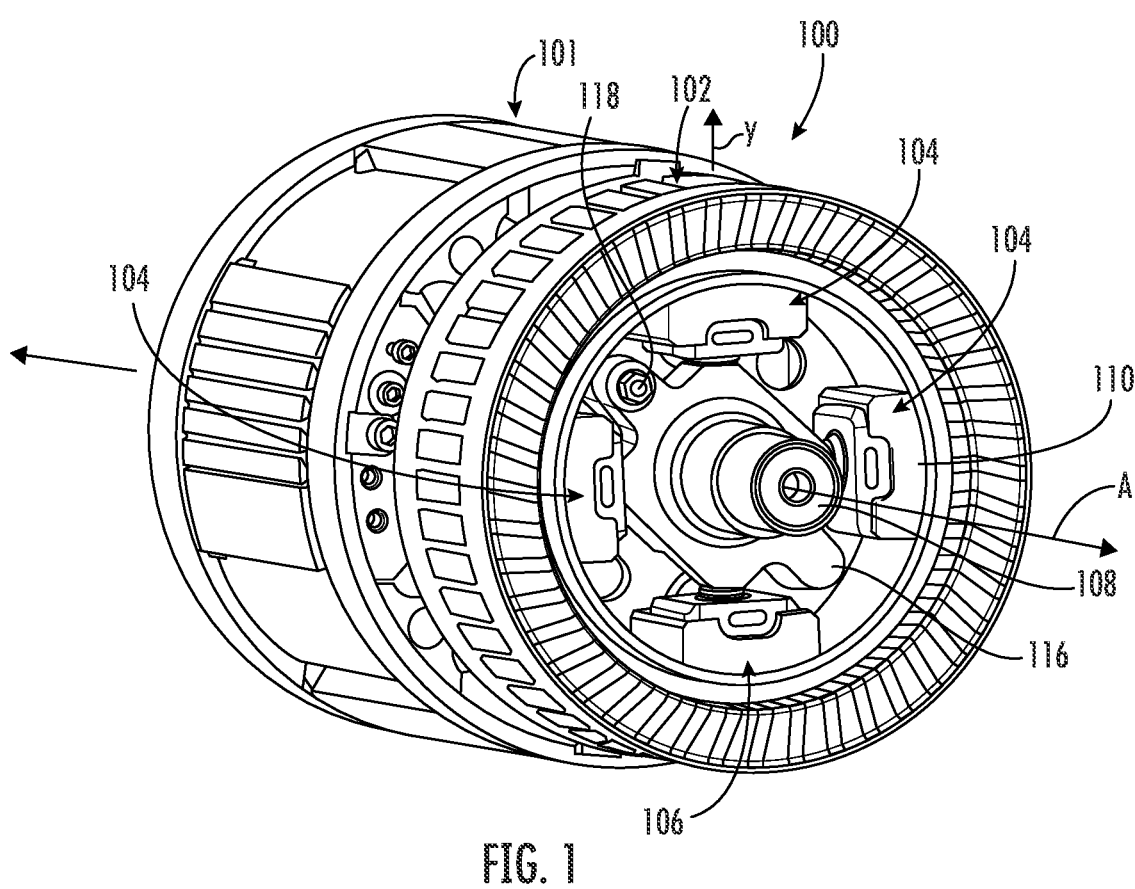
FIG. 1 is a schematic perspective view of an embodiment of a system constructed in accordance with the present disclosure, showing an exciter assembly with rectifier assemblies therein.

Reference will now be made to the drawings wherein like reference numerals identify similar structural features or aspects of the subject disclosure. For purposes of explanation and illustration, and not limitation, an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to provide rectifier assemblies capable of being used in electrical machines, e.g., generators, that operate at high rotational speeds. By having the diodes stacked in a radial direction with respect to a rotational axis of the main rotor, the diodes are less impacted by shear forces imparted due to the high rotational speed of the main rotor.

As shown in FIG. 1, an electrical machine assembly 100, e.g., an exciter assembly, includes an armature assembly 102 defining a rotational axis A and a plurality of rectifier assemblies 104. In accordance with some embodiments, armature assembly 102 is generally cylindrical in shape and rotational axis A is defined through a center point of armature assembly 102. Armature assembly 102 can be configured and adapted to be coupled with a rotor shaft 108 for rotation relative thereto. In the embodiment of FIG. 1, rotor shaft 108 is positioned through the center of armature assembly 102, aligned with and parallel to the rotational axis A. In the embodiment of FIG. 1, a longitudinal axis A of rotor shaft 108 is generally the same as rotational axis A, and rotor shaft is configured and adapted to rotate about rotational axis A, relative to armature assembly 102, which can be stationary. Rectifier assemblies 104 are spaced apart from one another circumferentially by ninety degrees about longitudinal axis A of shaft 108, which is the same axis as rotational axis A. Electrical machine assembly 100 can include a dummy rectifier assembly 106 offset from its adjacent rectifier assemblies 104, e.g., those at three o'clock and nine o'clock as depicted in FIG. 1, by at least ninety degrees about the longitudinal/rotational axis A. The dummy rectifier assembly 106 has the same mass and center of gravity as rectifier assemblies 104 such that balancing (both mass and center of mass) across the electrical machine assembly 100 can be achieved. Each rectifier assembly 104 defines a respective central longitudinal rectifier axis Y. When a given rectifier assembly 104 is assembled in electrical machine assembly 100, central longitudinal rectifier axis Y is at a non-parallel angle, e.g., a perpendicular angle, relative to the longitudinal/rotational axis A. By having the rectifier assemblies arranged in this radial manner, the effect of shear forces on the rectifier assemblies due to rotation of the main rotor shaft from the main generator are reduced. This, in turn, permits higher rotational speeds to be utilized.

Figure 2:
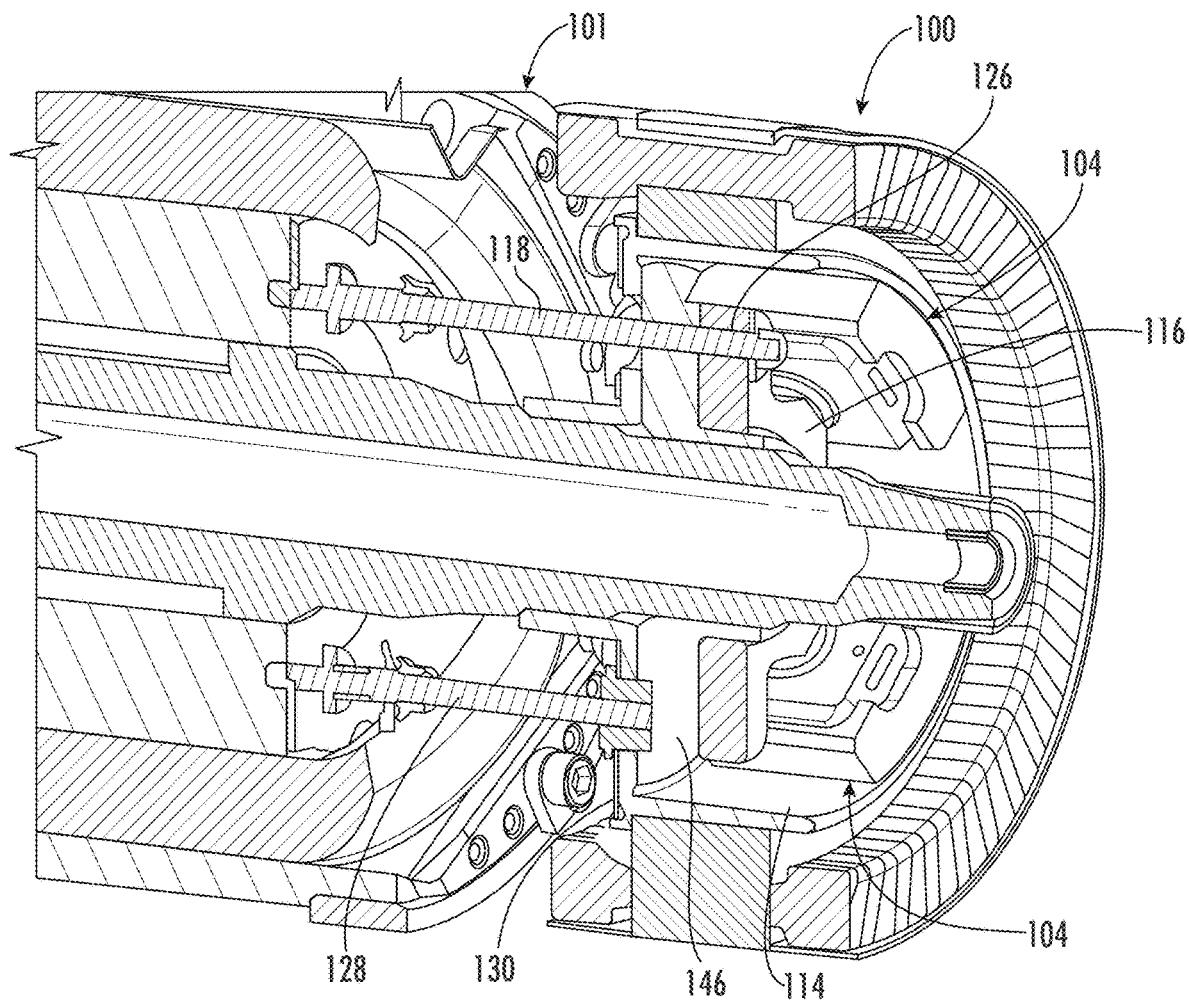
FIG. 2 is a schematic view of a cross-section of a portion of the system of FIG. 1, showing the electrical connections between DC current outputs and the rectifier assemblies.

With reference now to FIGS. 1-2, in some examples, each rectifier assembly 104 and dummy assembly 106 include a respective DC negative/ground output cap 110 and an insulative housing portion 112. Insulative housing portion 112 includes an aperture 120 configured and adapted to receive a portion of an AC terminal 122. Electrical machine assembly 100 includes an exciter hub casing 114 configured and adapted to be electrically connected to each DC negative/ground output cap 110 of the rectifier assemblies 104. Electrical machine assembly 100 includes a DC positive connector ring 116 and a DC positive terminal 118 in electrical communication with DC positive connector ring 116. DC positive connector ring 116 includes longitudinally facing aperture 126 to receive the DC positive terminal 118. DC positive connector ring 116 is positioned between each rectifier assembly 104 and DC positive terminal 118 to electrically couple each rectifier assembly 104 to the DC positive terminal 118. DC positive terminal 118 is electrically coupled to a main electrical machine 101, e.g., a main generator, to provide DC current thereto. Exciter hub casing 114 is electrically coupled to a ground plate 130 and a DC negative terminal 128. Electrical machine assembly 100 includes an insulator sleeve 146 surrounding a main rotor shaft input and having an aperture to receive DC positive terminal 118. Insulator sleeve 146 isolates the DC negative/ground terminal 128 from DC positive connector ring 116.

Figure 3:
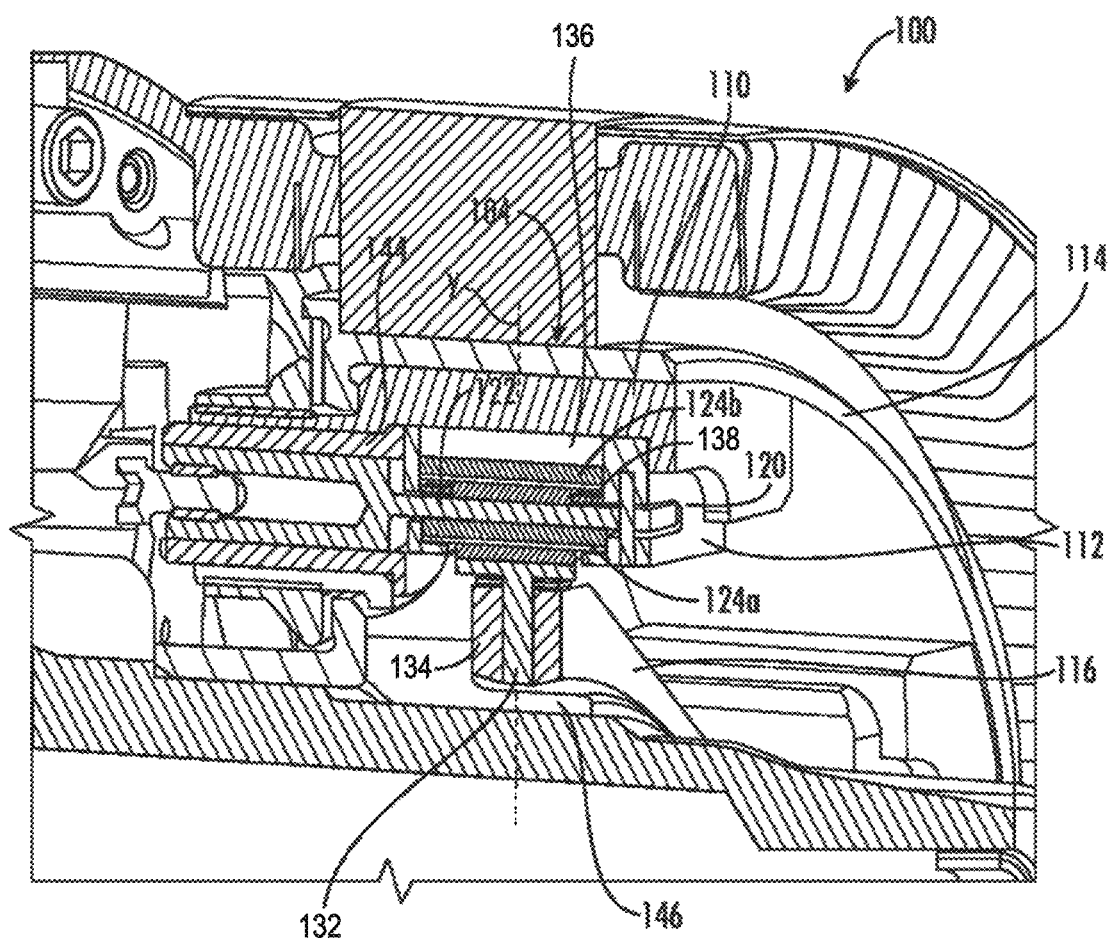
FIG. 3 is a schematic view of a cross-section of a portion of the system of FIG. 1, showing the diode stack-up in one of the rectifier assemblies.

As shown in FIG. 3, in some examples, each rectifier assembly 104 includes two diodes 124a and 124b. Each respective central longitudinal rectifier axis Y is defined through a center of the two diodes (separately referred labeled as first diode 124a and second diode 124b). Each rectifier assembly 104 includes a respective AC terminal 122 positioned between first diode 124a and second diode 124b and a DC positive output pin 132 electrically coupled to first diode 124a. Each rectifier assembly 104 includes an insulator sleeve 144 surrounding at least a portion of its respective AC terminal 122 so as to isolate the AC current from DC negative/ground output cap 110. The two diodes 124a and 124b of each rectifier assembly 104 are separated from one another by AC terminal 122. A portion of each AC terminal 122 extends outward from its respective rectifier assembly 104 at a non-parallel angle relative to the central longitudinal axis Y of rectifier assembly 104. Each DC negative/ground output cap 110 is positioned on a side of second diode 124b opposite from a respective AC terminal 122. Each DC negative/ground output cap 110 is in electrical communication with a respective second diode 124b. In some examples, each rectifier assembly 104 includes a conductive spacer 136 positioned radially outward from second diode 124b, between second diode 124b and the DC negative/ground output cap 110. An inner diameter wall of insulative housing portion 112 is on a side of first diode 124a opposite from second diode 124b.

Figure 4:
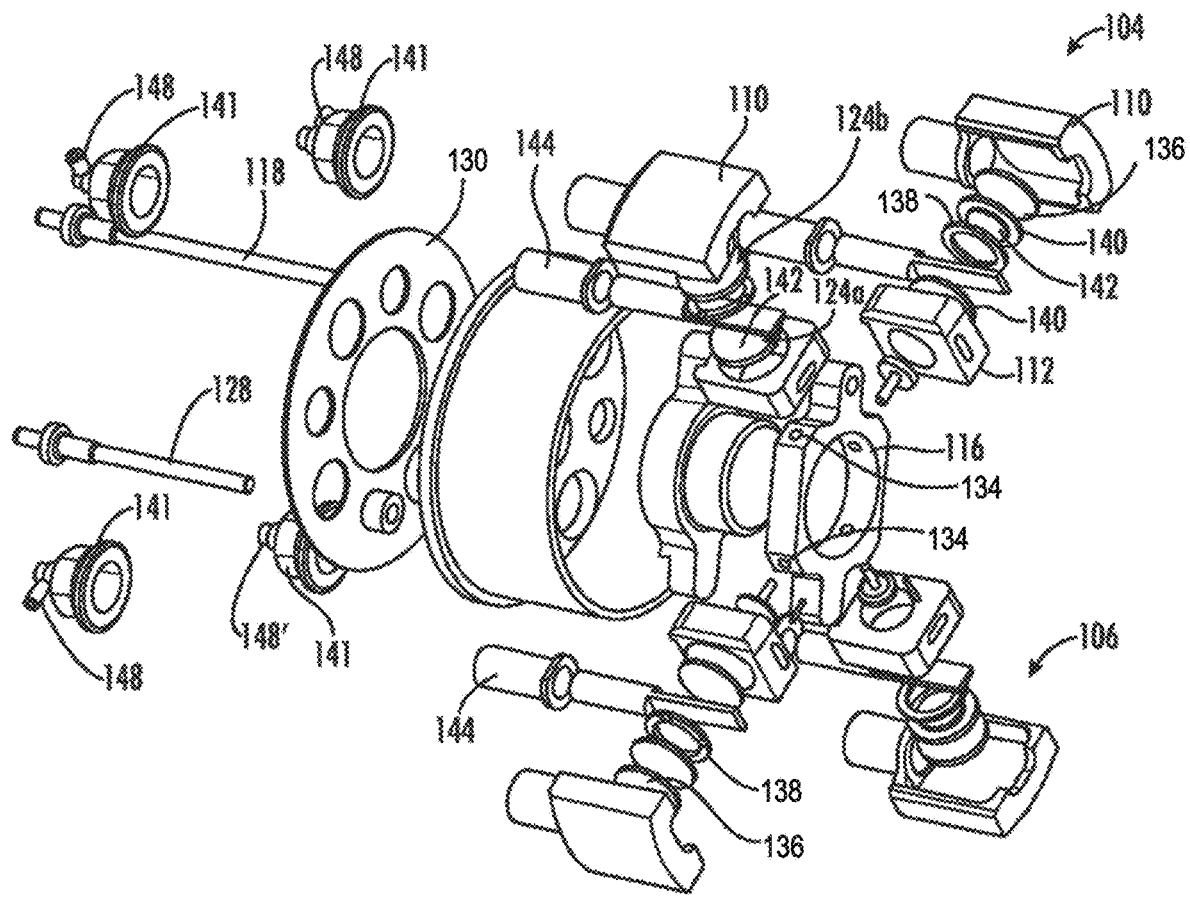
FIG. 4 is a schematic exploded view of a portion of the system of FIG. 1, showing the connections between the DC outputs and the diode stack-up.

With reference now to FIGS. 3-4, in accordance with some examples, DC positive connector ring 116 includes a plurality of radially facing connection apertures 134. The central longitudinal axis Y of each rectifier assembly 104 is parallel to a longitudinal axis defined by DC positive output pin 132. Each DC positive output pin 132 is electrically coupled within a respective radially facing connection aperture 134. First and second diodes 124a and 124b, respectively, each define a perimeter 140 and opposing flat surfaces 142. Central rectifier axis Y is defined perpendicular to flat surfaces 142 of each diode 124a and 124b. An insulator ring 138, or the like, is stacked between the first and second diodes 124a and 124b, respectively, to prevent current from jumping around either of diodes 124a or 124b. In some examples, electrical machine assembly 100 includes a plurality of AC connectors 148 (at least three) to couple each AC terminal 122 to the AC current of main generator 101. A dummy connector 148' can also be utilized for the dummy rectifier assembly 106. Four nuts 141 clamp ground plate 130 to each DC negative/ground output cap 110.

The methods and systems of the present disclosure, as described above and shown in the drawings, provide for electro-mechanical machines with more resilient, lighter weight, and higher current capacity rectifier assemblies. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electrical machine assembly comprising:
    an armature assembly defining a rotational axis, the armature assembly configured to be coupled with a rotor shaft for relative rotation therewith;
    a rectifier assembly including at least one diode and defining a central longitudinal rectifier axis extending radially from a center point of the armature assembly, wherein the central longitudinal rectifier axis is at a non-parallel angle relative to the rotational axis; and
    a dummy rectifier assembly offset from the rectifier assembly by at least ninety degrees about the rotational axis, wherein the dummy rectifier assembly has a same mass and center of gravity as the rectifier assembly to allow for mechanical balancing of the electrical machine assembly.

2. The electrical machine assembly as recited in claim 1, wherein the central longitudinal rectifier axis is at a perpendicular angle relative to the rotational axis.

3. The electrical machine assembly as recited in claim 1, wherein the at least one diode of the rectifier assembly includes two diodes separated from one another by an AC terminal.

4. The electrical machine assembly as recited in claim 3, wherein the rectifier assembly includes a DC negative/ground output cap positioned on a side of one of the two diodes opposite from the AC terminal.

5. The electrical machine assembly as recited in claim 1, wherein the at least one diode defines a perimeter and a planar surface, wherein the central longitudinal rectifier axis is defined perpendicular to the planar surface of the at least one diode.

6. The electrical machine assembly as recited in claim 1, wherein the rectifier assembly is a first rectifier assembly, the electrical machine assembly further comprising two additional rectifier assemblies.

7. The electrical machine assembly as recited in claim 6, wherein the two additional rectifier assemblies are each offset from the first rectifier assembly by at least ninety degrees about the rotational axis.

8. The electrical machine assembly as recited in claim 7, wherein the dummy rectifier assembly has a same mass and center of gravity as each of the two additional rectifier assemblies to allow for mechanical balancing of the electrical machine assembly.

9. The electrical machine assembly as recited in claim 1, further comprising a DC positive connector ring and a DC positive terminal in electrical communication therewith, wherein the DC positive connector ring is positioned between the rectifier assembly and the DC positive terminal.

10. The electrical machine assembly as recited in claim 9, wherein the rectifier assembly includes a DC positive output pin in electrical communication with the at least one diode, wherein the DC positive connector ring includes a radially facing connection aperture, wherein the DC positive output pin is electrically coupled within the radially facing connection aperture.

11. The electrical machine assembly as recited in claim 1, wherein the electrical machine assembly is an exciter assembly.

12. The electrical machine assembly as recited in claim 1, wherein the rotational axis is defined through the center point of the armature assembly.

13. An electrical machine assembly comprising:
    an armature assembly defining a rotational axis, the armature assembly configured to be coupled with a rotor shaft for relative rotation therewith;

a rectifier assembly comprising:
- a first diode;
- a second diode stacked with the first diode, wherein a central longitudinal rectifier axis of the rectifier assembly with respect to a center point of the armature assembly is defined through a center of the first and second diodes, and wherein the central longitudinal rectifier axis is at a non-parallel angle relative to the rotational axis;
- an AC terminal positioned between the first diode and the second diode, wherein a portion of the AC terminal extends outward from the rectifier assembly at a non-parallel angle relative to the central longitudinal rectifier axis of the rectifier assembly; and
- a DC positive output pin electrically coupled to the first diode, wherein the central longitudinal rectifier axis of the rectifier assembly is parallel to the DC positive output pin; and a dummy rectifier assembly offset from the rectifier assembly by at least ninety degrees about the rotational axis, wherein the dummy rectifier assembly has a same mass and center of gravity as the rectifier assembly to allow for mechanical balancing of the electrical machine assembly.

14. The electrical machine assembly as recited in claim 13, wherein the rectifier assembly further comprises:
- a DC negative/ground output cap positioned on a side of the second diode opposite from the AC terminal, wherein the DC negative/ground output cap is in electrical communication with the second diode; and
- a conductive spacer positioned between the second diode and the DC negative/ground output cap.

15. The electrical machine assembly as recited in claim 13, wherein the rectifier assembly further comprises an insulator ring stacked between the first and second diodes.

16. The electrical machine assembly as recited in claim 13, wherein the central longitudinal rectifier axis of the rectifier assembly is configured to be at a perpendicular angle relative to the rotational axis.

17. The electrical machine assembly as recited in claim 13, wherein the rectifier assembly further comprises an insulative housing portion on a side of the first diode opposite from the second diode.

18. The electrical machine assembly as recited in claim 17, wherein the insulative housing portion includes an aperture configured to receive a portion of the AC terminal.

19. The electrical machine assembly as recited in claim 13, wherein each of the first and second diodes defines a respective perimeter and a respective planar surface, wherein the central longitudinal rectifier axis is defined through the first and second diodes at a non-parallel angle relative to the respective planar surfaces.

20. An electrical machine assembly comprising:
- an armature assembly defining a rotational axis, the armature assembly configured to be coupled with a rotor shaft for relative rotation therewith;
- a first rectifier assembly and two additional rectifier assemblies, each rectifier assembly including at least one diode and defining a central longitudinal rectifier axis with respect to a center point of the armature assembly, wherein the central longitudinal rectifier axis is at a non-parallel angle relative to the rotational axis, and wherein the two additional rectifier assemblies are each offset from the first rectifier assembly by at least ninety degrees about the rotational axis; and
- a dummy rectifier assembly offset from the first rectifier assembly by at least ninety degrees about the rotational axis, wherein the dummy rectifier assembly has a same mass and center of gravity as the first rectifier assembly and each of the two additional rectifier assemblies to allow for mechanical balancing of the electrical machine assembly.

* * * * *